UNITED STATES PATENT OFFICE.

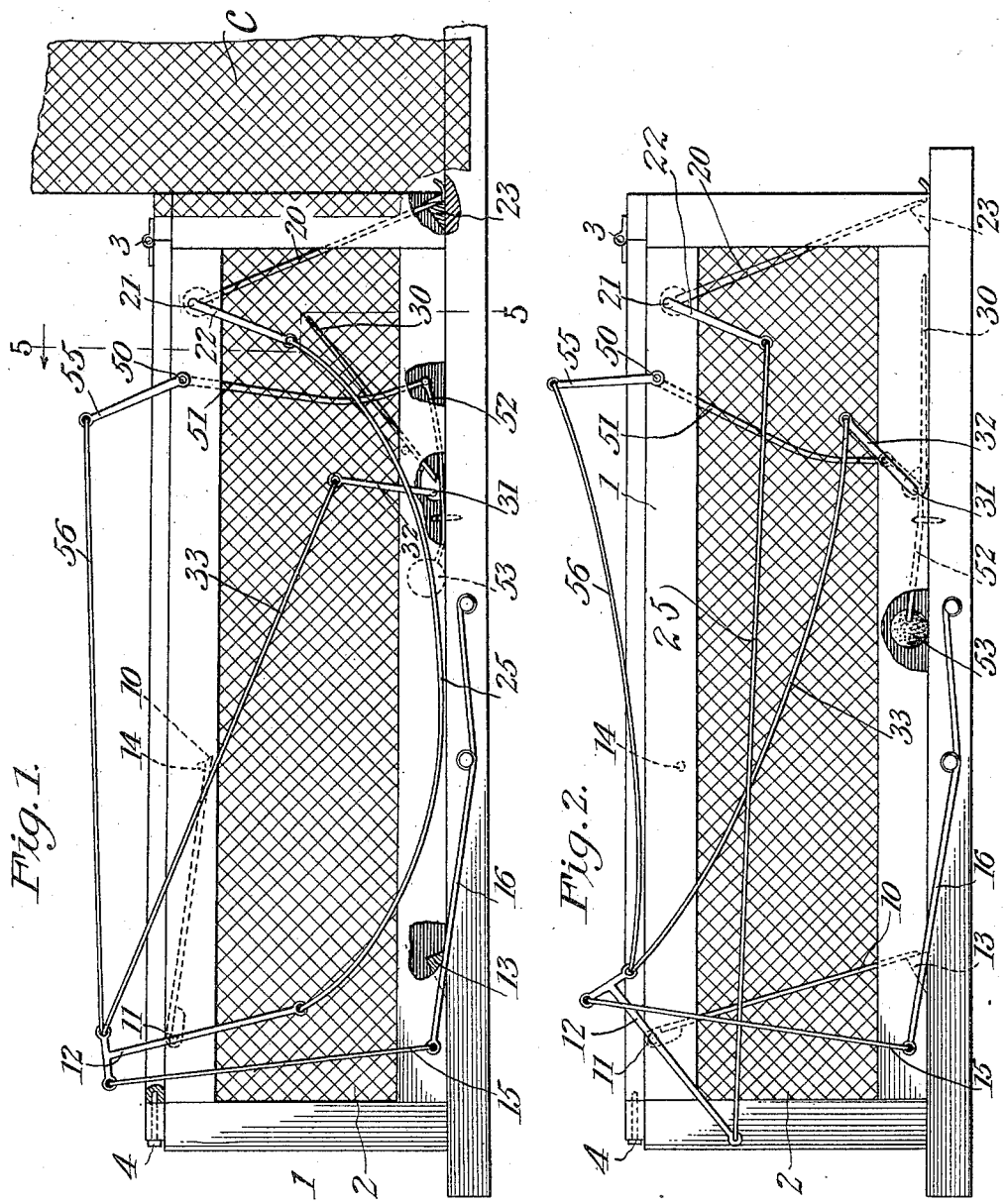

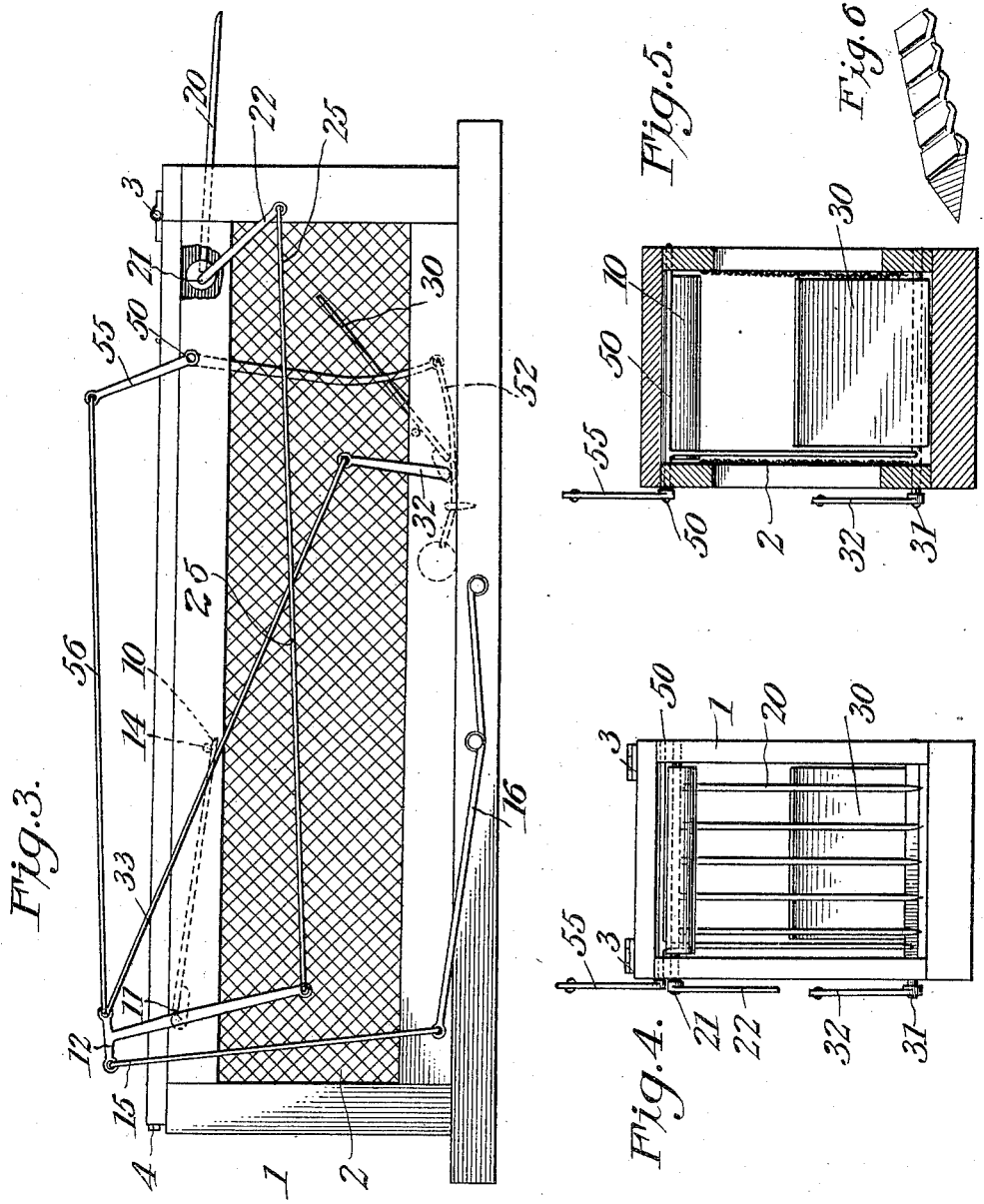

JOHN H. VOSS, OF WALNUT, IOWA.

VICTIM-SET ANIMAL-TRAP.

1,051,469. Specification of Letters Patent. Patented Jan. 28, 1913.

Application filed May 27, 1912. Serial No. 699,934.

*To all whom it may concern:*

Be it known that I, JOHN H. VOSS, a citizen of the United States, residing at Walnut, in the county of Pottawattamie and State of Iowa, have invented certain new and useful Improvements in Victim-Set Animal-Traps; and I do declare the following to be a full, clear, and exact description of the invention, such as will enable others skilled in the art to which it appertains to make and use the same.

This invention relates to traps, and more especially to those which are set by the victim; and the object of the same is to produce a trap of this character in which the victim (be it animal, fowl or anything else to which the trap is adapted) will close the front door behind himself either by nibbling on the bait or on passing over an internal platform, and will close the latter behind himself and simultaneously open the front door as he passes under the rear door and out of the trap into a cage with which the trap is used. This object is accomplished by constructing the trap in the manner hereinafter more fully described and claimed, and as shown in the drawings wherein—

Figure 1 is a side elevation of this improved trap partly broken away, with its parts "set;" Fig. 2 is a similar side elevation with its parts "sprung" so that the animal is supposed to be trapped therein; Fig. 3 is a side elevation showing the rear door opened as it would be by the exit of the animal, when its wire re-sets the trap; Fig. 4 is an end elevation of the trap shown in Fig. 1, taken from the rear thereof; and Fig. 5 is a cross section on the line 5—5 of Fig. 1. Fig. 6 is a perspective detail of the stop hereinafter referred to.

The body of this trap comprises a substantially rectangular framework 1, the two sides and top being covered with netting or other reticulated fabric 2, the top panel being preferably hinged as at 3 and latched as at 4 so that it may be raised to gain access to the interior as for applying the bait, and the front and rear ends of the body being left open for the entrance and exit of the victims. The exact sizes, shapes, proportions, and materials of these and other parts yet to be described are matters of no moment in connection with this invention, and changes therein may be made as do not depart from the spirit of the same. It is obvious that if the trap is intended for catching small animals such as mice it will be built on a small scale and the cage (not shown) used with it will be small, whereas if the trap is intended for catching larger animals the proportions of all parts will be amplified.

What might be called the front door 10 is supported at its upper edge on a cross bar 11 having at one side of the trap a T-shaped extension 12, and the rear or lower edge of the door when closed strikes against a sill 13 secured across the bottom of the trap body, or strikes against a stop 14 within the body when the door is opened. The forward arm of the head of the T-shaped extension 12 is connected by a wire or chain 15 with a spring 16 outside the body, the tension of this spring tending normally to swing the front door to open position, although when the extension is moved to swing the door to closed position, the upper end of said wire or chain passes the pivotal line on which the door is hung and the tension of the spring enables it to keep the door closed in a manner which will be clear.

What might be called the rear door 20 is supported across its upper edge within the frame of the body as at 21, and the outer end of its supporting shaft is depressed into a lever 22, while the free end of this door when closed rests against a notched sill 23 whose notches receive the tips of the tongues of which the body of the door is by preference composed. Said lever is connected outside the cage body by means of a wire or chain 25 with the lower portion of the T-shaped extension 12 on the shaft of the front door, and it follows that when the victim passes under the rear door the movement of the lever to the rear turns the extension so that the front door is automatically opened.

What might be called an intermediate door, although in reality it is more properly speaking a platform 30, is pivoted at its lower forward edge at 31 in the frame work of the trap body, its pivotal shaft rising into a lever 32 outside said body and connected by a wire or chain 33 with the head of said T-shaped extension, the length of the wire or chain being such that as the victim passes to the rear over the platform and depresses it, the lever will draw on the wire or chain and close the front door. Endeavoring to pass to the rear he next passes under the rear door which opens the front door in a manner just described.

As an auxiliary means for closing the front door behind the victim, I provide a special form of bait holding device. This consists of a shaft 50 journaled in the top of the frame work of the trap body, and having a pendent arm 51 inside said frame work, from the lower end of which a chain 52 leads forward past the platform and carries the bait indicated at 53 which stands nearer the front end of the trap and in position for the victim to reach even before he has passed over the platform. The outer end of the shaft 50 carries an upstanding lever or arm 55 connected by a chain or wire 56 with the head of the T-shaped extension 12, and it follows that if the victim grabs the bait and draws it toward the front door he swings the device so that the rearward movement of its upstanding lever causes the front door to close. The light at the rear attracts the victim, and he will then pass over the platform and out the back door, which last act opens the front door in a manner already described. Particular attention is called to the fact that the opening of the back door causes the opening of the front door, and the movement of the T-shaped extension 12 also causes the rise of the platform 30, so that the trap is completely set ready for the next victim.

Thus it will be seen that I have produced a trap having in reality three doors and in which when set the two rearmost doors stand closed. The victim enters under the open front door and, either by pulling on the bait or passing over the intermediate door or platform, depresses the latter and closes the front door behind him, and then he is within the trap between its two extreme doors which are both closed. Passing onward to the rear because he sees a light through the openwork rear door, he lifts the latter, closes the platform or intermediate door behind him, and opens the front door so that he sets the trap ready for the next victim; and from the rear door he passes into a large cage C.

What is claimed as new is:—

1. In a trap of the class described, the combination with the body normally open at its front and rear ends, a front door hinged across its top therein and having a T-shaped extension on the extremity of its hinge line standing outside the body, a spring attached to the latter, and a chain connecting the spring with the front end of the head of said extension and adapted to pass across the projected pivotal line when the door is moved; of a rear door having a lever extended from its hinge line, connections between said lever and the lower arm of said T-shaped extension whereby the front door is opened by the opening of the rear door, an intermediate platform hinged between said doors within the body and also having a lever on its extended hinge line, and connections between this lever and the upper end of said extension for the purpose set forth.

2. In a trap of the class described, the combination with the body normally open at its front and rear ends, a front door hinged across its top therein and having a T-shaped extension on the extremity of its hinge line standing outside the body, a spring attached to the latter, and a chain connecting the spring with the front end of the head of said extension and adapted to pass across the projected pivotal line when the door is moved; of a rear door having a lever extended from its hinge line, connections between said lever and the lower arm of said T-shaped extension whereby the front door is opened by the opening of the rear door, a platform hinged within the body between the two doors, connections between this platform and the upper end of said extension on the front door for closing the latter when the platform is depressed, a rocking bait-holder also mounted within the body and having a depending arm therein and an upstanding lever exterior thereto, connections between said lever and the head of said extension on the front door, a chain leading from said depending arm past the platform, and bait attaching means at the front end of said chain.

3. In a trap of the class described, the combination with the body normally open at its front and rear ends, a front door hinged across its top therein and having a T-shaped extension on the extremity of its hinge line standing outside the body, a spring attached to the latter, and a chain connecting the spring with the front end of the head of said extension and adapted to pass across the projected hinge line when the door is moved; of a rear door having a lever extended from its hinge line, connections between said lever and the lower arm of said T-shaped extension whereby the front door is opened by the opening of the rear door, a platform hinged between the said doors within the body and also having a lever on its extended hinge line, connections between this lever and the upper end of said extension, a rock shaft mounted in the body and having an upstanding lever on its outer end, connections between this lever and the head of said T-shaped extension, an arm depending rigidly from said rock shaft, and bait-holding means connected with the lower end of said arm, for the purpose set forth.

4. In a trap of the class described, the combination with the body normally open at its front and rear ends, a front door hinged therein and having an extension on the extremity of its hinge line, and a spring connected to said extension and adapted to pass across the projected hinge line when the door is moved; of a rear door having a lever extended from its hinge line, connections between said lever and the extension whereby the front door is opened by the opening of the rear door, a rock shaft mounted in the body and having a lever on its outer end, connections between this lever and the extension, an arm depending rigidly from said rock shaft whereby the front door is closed by a pull on the arm, and bait-holding means connected with said arm, for the purpose set forth.

5. In a trap of the class described, the combination with the body normally open at its front and rear ends, and a front door hinged across its top therein and having an extension on the extremity of its hinge line; of a rear door having a lever extended from its hinge line, connections between said lever and the lower arm of said extension whereby the front door is opened by the opening of the rear door, means for holding the front door open, a rock shaft mounted in the body and having a lever on its outer end, connections between this lever and the head of said extension for tripping said holding means, an arm depending rigidly from said rock shaft, and bait-holding means connected with the lower end of said arm, for the purpose set forth.

In testimony whereof I have hereunto set my hand in presence of two subscribing witnesses.

JOHN H. VOSS.

Witnesses:
 H. P. KOLL,
 A. J. HANSEN.

---

Copies of this patent may be obtained for five cents each, by addressing the "Commissioner of Patents, Washington, D. C."